(12) United States Patent
    Reddy Arava et al.

(10) Patent No.:  US 12,700,644 B2
(45) Date of Patent:       Aug. 4, 2026

(54) INHIBITION OF LITHIUM DENDRITE GROWTH USING ULTRA-THIN SUB-NANOMETER POROUS CARBON NANOMEMBRANE IN CONVENTIONAL AND SOLID-STATE LITHIUM-ION BATTERIES

(71) Applicants:Wayne State University, Detroit, MI (US); Friedrich Schiller University Jena, Jena (DE)

(72) Inventors: Leela Mohana Reddy Arava, Troy, MI (US); Naresh K. Thangavel, Allen Park, MI (US); Sathish Rajendran, Detroit, MI (US); Zian Tang, Jena (DE); Antony George, Jena (DE); Andrey Turchanin, Jena (DE)

(73) Assignees: Wayne State University, Detroit, MI (US); Friedrich Schiller University Jena, Jena (DE)

( * ) Notice: Subject to any disclaimer, the term of this patent is extended or adjusted under 35 U.S.C. 154(b) by 818 days.

(21) Appl. No.: 17/923,360

(22) PCT Filed: May 5, 2021

(86) PCT No.: PCT/US2021/030795
     § 371 (c)(1),
     (2) Date: Nov. 4, 2022

(87) PCT Pub. No.: WO2021/226180
     PCT Pub. Date: Nov. 11, 2021

(65)             Prior Publication Data
     US 2023/0223654 A1       Jul. 13, 2023

Related U.S. Application Data

(60) Provisional application No. 63/020,567, filed on May 6, 2020.

(51) Int. Cl.
     H01M 50/451       (2021.01)
     H01M 4/38          (2006.01)
                (Continued)

(52) U.S. Cl.
     CPC ......... H01M 50/451 (2021.01); H01M 4/382 (2013.01); H01M 10/0525 (2013.01);
                (Continued)

(58) Field of Classification Search
     None
     See application file for complete search history.

(56)               References Cited

U.S. PATENT DOCUMENTS

2019/0348657 A1    11/2019  Frischmann

OTHER PUBLICATIONS

Turchanin et al., "Carbon Nanomembranes," Advanced Materials 28, 6075-6103, 2016.*
                (Continued)

*Primary Examiner* — Jonathan Crepeau
(74) *Attorney, Agent, or Firm* — Fishman Stewart PLLC

(57)               ABSTRACT

An exemplary lithium-ion battery may include an anode, a cathode, and a separator between the anode and cathode. The separator may be at least partially coated with a sub-nanometer porous membrane. The battery may be a conventional battery in which the anode and cathode are at least partially submerged in an electrolytic solution. Alternatively, the battery may be a solid-state battery disposed between the anode and cathode and having a solid-state electrolyte, which may serve as the separator.

20 Claims, 8 Drawing Sheets

(51) Int. Cl.

| | | |
|---|---|---|
| *H01M 10/0525* | (2010.01) | |
| *H01M 10/0562* | (2010.01) | |
| *H01M 10/0569* | (2010.01) | |
| *H01M 50/417* | (2021.01) | |
| *H01M 50/449* | (2021.01) | |
| *H01M 50/489* | (2021.01) | |

(52) U.S. Cl.
CPC ... *H01M 10/0562* (2013.01); *H01M 10/0569* (2013.01); *H01M 50/417* (2021.01); *H01M 50/449* (2021.01); *H01M 50/489* (2021.01); *H01M 2300/0037* (2013.01); *H01M 2300/0071* (2013.01)

(56) References Cited

OTHER PUBLICATIONS

Pistoia et al., "Lithium-Ion Batteries: Advances and Applications," Chapter 1, section 1, Elsevier (2014).*

Wang Jianyi et al., "Covalent Organic Frameworks as the Coating Layer of Ceramic Separator for High-Efficiency Lithium-Sulfur Batteries," ACS Applied Nano Materials, Dec. 12, 2017, vol. 1, No. 1, pp. 132-138.

Yan, Kai et al., "Ultrathin Two-Dimensional Atomic Crystals as Stable Interfacial Layer for Improvement of Lithium Metal Anode," Nano Letters, 2014, vol. 14, No. 10, pp. 6016-6022.

Rajendra Honghally Basappa et al., "Contact between Garnet-Type Solid Electrolyte and Lithium Metal Anode: Influence on Charge Transfer Resistance and Short Circuit Prevention," J. Electrochem. Soc., Feb. 3, 2017, pp. A666-A671, retrieved from the internet URL https://iopscience.iop.org/article/10.1149/2.0841704jes/pdf (retrieved on Aug. 5, 2021).

Li, Changyi et al., "Polysulfide-Blocking Microporous Polymer Membrane Tailored for Hybrid Li-Sulfur Flow Batteries," Nano Letters, 2015, vol. 15, No. 9, pp. 5724-5729.

International Search Report dated Aug. 19, 2021 for copending Int'l. App. No. PCT/US2021/030795.

Xianghui Zhang et al., "Tailoring the Mechanics of Ultrathin Carbon Nanomembranes by Molecular Design," Langmuir , 2014, vol. 30, No. 27, pp. 8221-8227.

Yang Yang et al., "Rapid Water Permeation Through Carbon Nanomembranes with Sub-Nanometer Channels," ACS Nano, 2018, vol. 12, No. 5, pp. 4695-4701.

Turchanin, Andrey et al., "One Nanometer Thin Carbon Nanosheets with Tunable Conductivity and Stiffness," Advanced Materials, 2009, vol. 21, No. 12, pp. 1233-1237.

Paul Penner et al., "Charge Transport through Carbon Nanomembranes," The Journal of Physical Chemistry C, 2014, vol. 118, No. 37, pp. 21687-21694.

Zhang, Xianghui et al. "Mechanical characterization of carbon nanomembranes from self-assembled monolayers." Beilstein journal of nanotechnology, 2011, vol. 2, pp. 826-833.

* cited by examiner

200

204

206

202

210

INHIBITION OF LITHIUM DENDRITE GROWTH USING ULTRA-THIN SUB-NANOMETER POROUS CARBON NANOMEMBRANE IN CONVENTIONAL AND SOLID-STATE LITHIUM-ION BATTERIES

CROSS-REFERENCE TO RELATED APPLICATIONS

This application is a national phase application of and claims priority to International Patent Application No. PCT/US2021/030795, filed on May 5, 2021, which claims priority to U.S. Provisional Patent Application No. 63/020,567 filed on May 6, 2020, the contents of each of which are hereby incorporated by reference in their entirety.

TECHNICAL FIELD

This disclosure relates generally to a method of suppressing lithium dendrites for achieving high energy density batteries by the method of incorporating a nanomembrane in lithium-ion batteries, including conventional lithium-ion batteries using a separator and solid-state batteries those using a garnet-type solid-state electrolyte.

BACKGROUND

The present invention disclosed about the novel application of sub-nanometer porous carbon nanomembrane that enables the use of lithium metal as anodes in conventional and solid-state lithium-ion batteries. The existing Li-ion battery technology is insufficient to meet the future growing energy demands. Use of lithium metal anode is the best solution as it has the highest specific capacity (3861 mAh $g^{-1}$) and paves a way to construct batteries with high energy density. However, use of lithium metal anode is hindered by the formation of lithium dendrites that reduces the coulombic efficiency. Further, the use of lithium metal anode in the existent technology is not possible due to safety issues arising from the chances of short-circuits during the propagation of lithium dendrites. As such, in the current technology, the use of lithium metal anode is not feasible. Instead, an anode material, graphite, ~10 orders lower capacity (372 mAh $g^{-1}$) is used in the current technology.

Thus, there is a need to develop an improved lithium-ion battery that addresses the aforementioned challenges or shortcomings.

DETAILED DESCRIPTION

An exemplary lithium-ion battery may include an anode, a cathode, a separator between the anode and cathode, the separator being at least partially coated with a sub-nanometer porous membrane. Another exemplary lithium-ion battery may include an anode, a cathode, an electrolytic solution in which the anode and cathode are at least partially submerged, a separator between the anode and cathode, and a sub-nanometer porous membrane at least partially coating the separator. Yet another exemplary lithium-ion battery may include an anode, a cathode, a solid electrolyte disposed between the anode and cathode, and a sub-nanometer porous membrane at least partially coating the separator.

According to the present disclosure, the application of an ultrathin sub-nanometer porous carbon nanomembrane with lithium-ion batteries inhibits the mossy metal deposits (dendrite) propagation and its possibility to penetrate through the separator/solid electrolyte. The sub-nanometer porous carbon membrane may include one or more of the following properties to regulate the lithium-ion flux movement across the electrodes:

(i) Sub-nanometer porous with an average pore diameter of about 0.3 nm to about 0.9 nm, and with a pore density of about $10^{12}$ pores per $cm^2$ to about $10^{14}$ pores per $cm^2$.

(ii) Ultra-thin membrane with a thickness of about 0.6 nm to 2.0 nm.

(iii) High mechanical strength with a Young's modulus of about 5 GPA to about 500 GPa and high chemical stability with metallic lithium.

(iv) Electronically insulating with a relative dielectric constant of about 3-5.

The sub-nanometer porosity of the membrane may help in regulating the lithium-ion movement across the interface that ensures uniform lithium-ion flux, whereas the ultra-thin property offers negligible changes to the energy density of the battery. Further, the high mechanical strength of the membrane aids in suppressing the lithium dendrites, and the electronically insulating properties blocks any electron movement across the electrodes that is one of the critical issues in solid-state batteries. These multiple properties of the constructed membrane aid in the suppression of lithium dendrites growth across the electrodes.

Figure 1:
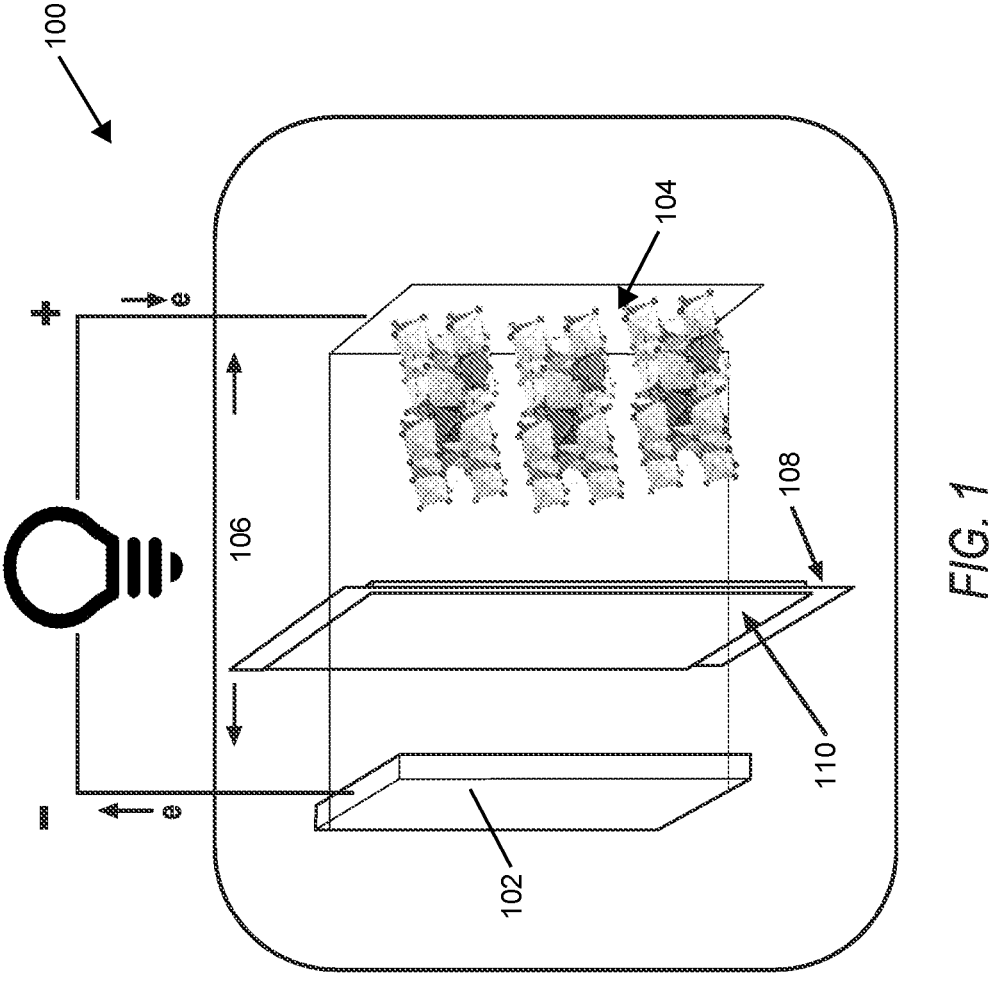
FIG. 1 is a schematic illustration of an exemplary lithium-ion battery with a separator having a sub-nanometer porous membrane according to teachings of the present disclosure.
Figures 2A, 2B, 2C, 2D, 2E, 2F:
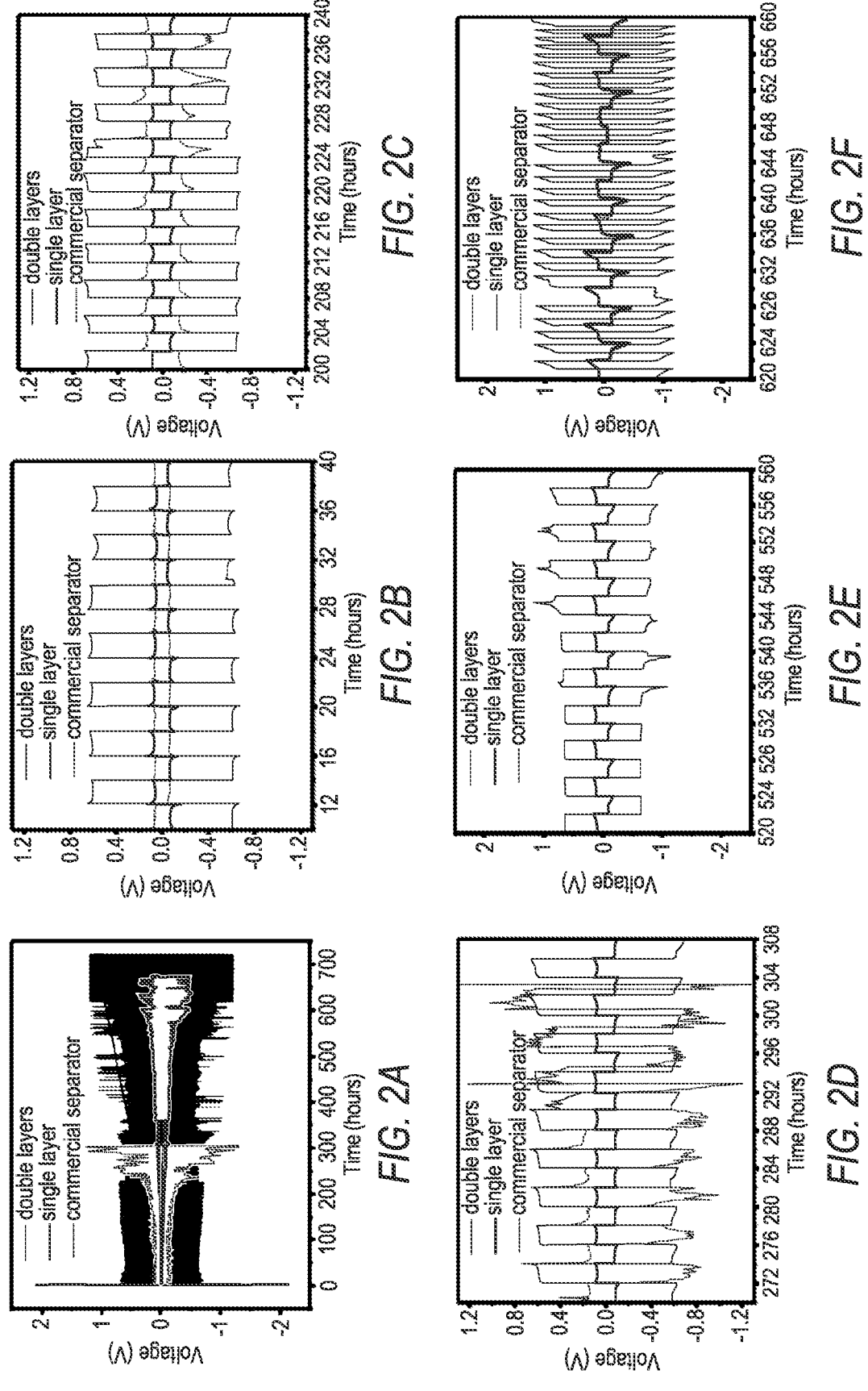
FIGS. 2A-2F illustrate results of dendrites testing of a symmetrical cell without the sub-nanometer porous membrane (commercial separator), with a single layer of the sub-nanometer porous membrane, and with double layers of the sub-nanometer porous membrane across multiple time intervals.
Figure 3:
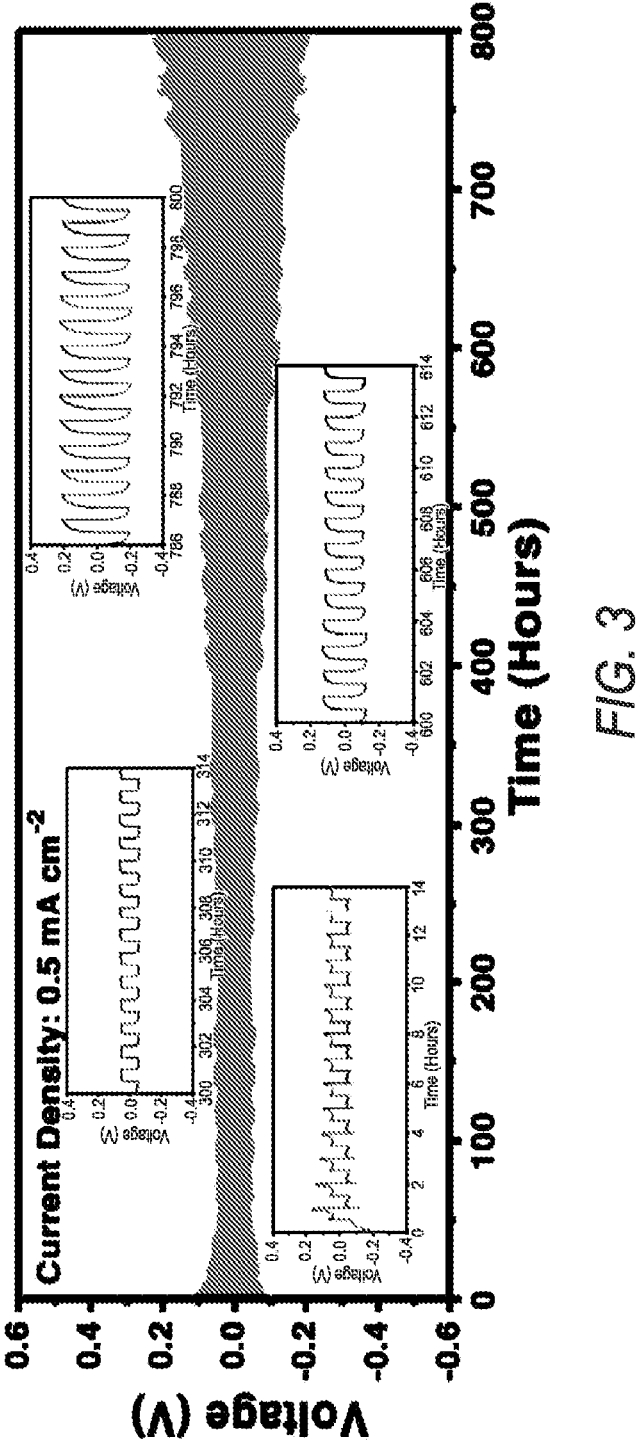
FIG. 3 illustrates results of dendrites testing of the exemplary Li symmetrical with a single layer of the sub-nanometer porous membrane at a constant current density.
Figure 4:
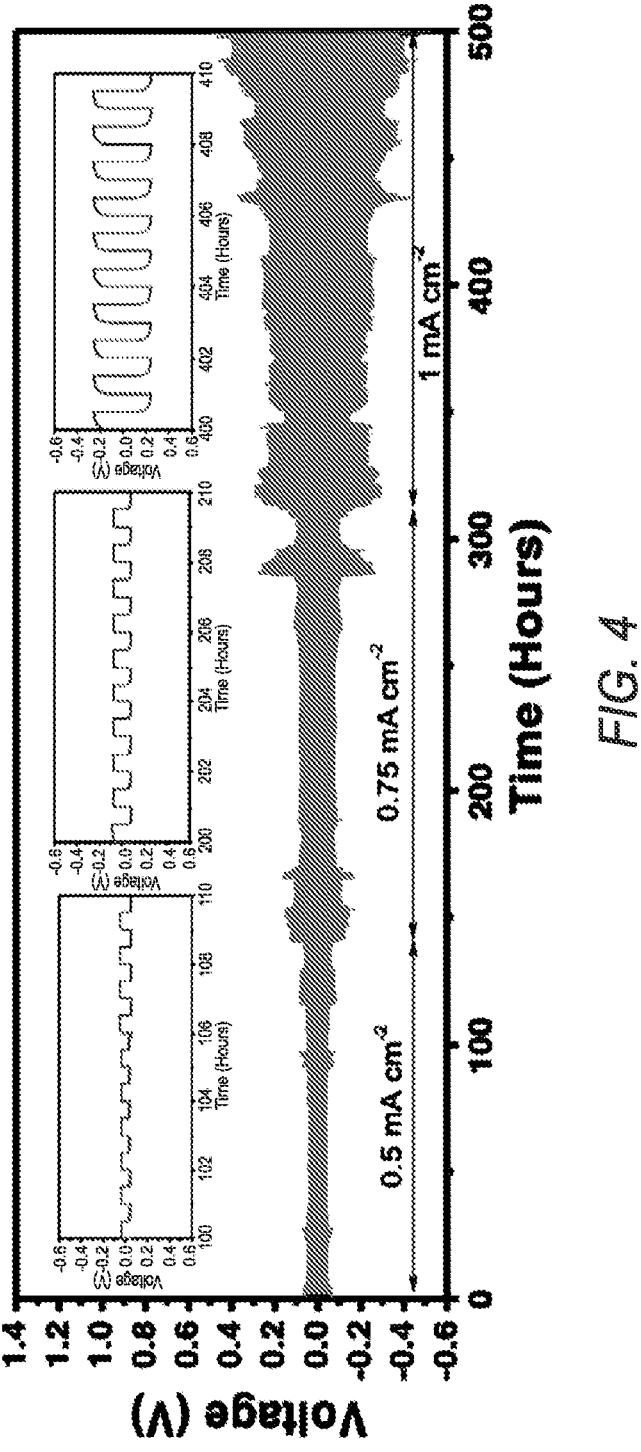
FIG. 4 illustrates results of dendrites testing of the exemplary lithium-ion battery of FIG. 1 with a single layer of the sub-nanometer porous membrane at variable current densities.

Referring now to the figures, FIG. 1 illustrates a lithium-ion battery 10 according to one exemplary approach. The lithium-ion battery 100 may be a "conventional" battery having an anode 102, a cathode 104, and an electrolytic solution 106 in which the anode 102 and cathode 104 may be at least partially submerged. The anode 102 generally may be a lithium metal anode. The electrolytic solution 106 may include, but is not limited to, 1M $LiPF_6$ in ethylene carbonate (EC) and dimethyl carbonate (DMC) in a 1:1 ratio. The lithium-ion battery 100 may also include a separator 108 between the anode 102 and the cathode 104. The separator 108 may be, for example, a commercial Celgard separator.

The separator 108 may have a sub-nanometer porous membrane 110 coated on or around at least a portion of the separator 108. The sub-nanometer porous membrane 110 generally may inhibit the mossy metal deposits (dendrite) propagation and its possibility to penetrate through the separator 108 and may regulate the lithium-ion flux movement across the electrodes. In embodiments, the sub-nanometer porous membrane 110 may have an average pore diameter ranging between about 0.3 nm and about 0.9 nm. The sub-nanometer porous membrane 110 may have a pore density ranging between about $10^{12}$ pores per $cm^2$ and about $10^{14}$ pores per $cm^2$. The sub-nanometer porous membrane 110 may have a thickness ranging between about 0.6 nm and 2.0 nm. For example, the sub-nanometer porous membrane 110 may be and/or may incorporate a carbon nanomembrane (CNM). CNMs are two-dimensional layers or sheets with a nanometer thickness, such as described in an article titled "Carbon Nanomembranes" published in *Advanced Materials* in 2016, which is incorporated by reference herein.

With embodiments, the sub-nanometer porous membrane 110 may have a Young's Modulus ranging between about 5 GPa and about 500 GPa, more particularly, between about 5 GPa and 50 GPa. The sub-nanometer porous membrane 110 may have high chemical stability with, lithium, including, but not limited to, lithium ions, metallic lithium, and the like. The sub-nanometer porous membrane 110 further may be electronically insulating, for example and without limitation, have a relative dielectric constant of about 3 to about 5.

The sub-nanometer porosity of the membrane 110 may help in regulating the lithium-ion movement across the interface that ensures uniform lithium-ion flux, whereas the ultra-thin property offers negligible changes to the energy density of the battery. Further, the high mechanical strength of the membrane 110 aids in suppressing the lithium dendrites, and the electronically insulating properties at least partially or at least substantially blocks any electron movement across the electrodes that is one of the critical issues in solid-state batteries. These multiple properties of the constructed membrane 110 aid in the suppression of lithium dendrites growth across the electrodes.

The sub-nanometer porous membrane 110 may be applied as a single layer or as a double layer.

Referring now to FIG. 2A through FIG. 4, the results of various dendrites testing on a symmetrical cell of a lithium-ion battery as described above are illustrated. As seen in the results, the lithium-ion battery with a single layer of the sub-nanometer porous membrane had very high performance compared to the lithium-ion battery without a sub-nanometer porous membrane and to the lithium-ion battery with double layers of the sub-nanometer porous membrane. As further seen in the results, the double layer coated separators had high polarization.

Figure 5:
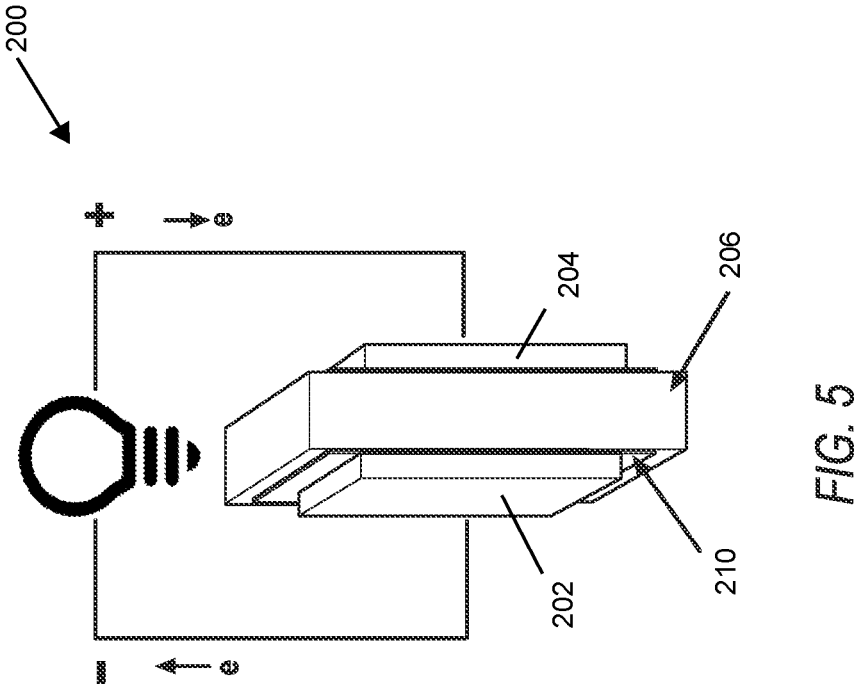
FIG. 5 is a schematic illustration of an exemplary lithium-ion battery with a solid electrolyte having a sub-nanometer porous membrane according to teachings of the present disclosure.

Referring now to FIG. 5, a lithium-ion battery 200 according to another exemplary approach is illustrated. In particular, the lithium-ion battery 200 may be an all-solid-state battery in which a solid electrolyte 206 may be disposed between the anode 202 and the cathode 204. As with the embodiment of FIG. 1, the anode generally may be a lithium metal anode. The solid electrolyte 206 may be a garnet-type electrolyte, for example and without limitation, $Li_{6.5}La_3Zr_{1.5}Ta_{6.5}O_{12}$ (LLZT).

The solid electrolyte 206 may have a sub-nanometer porous membrane 210 coated on or around at least a portion of the solid electrolyte 206. As with the embodiment of FIG. 1, the sub-nanometer porous membrane 210 generally may inhibit the mossy metal deposits (dendrite) propagation and its possibility to penetrate through the solid electrolyte 206 and may regulate the lithium-ion flux movement across the electrodes. In embodiments, the sub-nanometer porous membrane 210 may have an average pore diameter ranging between about 0.3 nm and about 0.9 nm. The sub-nanometer porous membrane 210 may have a pore density ranging between about $10^{12}$ pores per $cm^2$ and $10^{14}$ pores per $cm^2$. The sub-nanometer porous membrane 210 may have a thickness ranging between about 0.6 nm and 2.0 nm. For example, the sub-nanometer porous membrane 210 may be and/or may incorporate a carbon nanomembrane (CNM). With embodiments, the sub-nanometer porous membrane 210 may have a Young's Modulus ranging between about 5 GPa to about 500 GPa, more particularly, between about 5 GPa and 50 GPa. The sub-nanometer porous membrane 210 may have high chemical stability with metallic lithium. The sub-nanometer porous membrane 210 further may be electronically insulating, for example and without limitation, have a relative dielectric constant of about 3 to about 5.

The sub-nanometer porous membrane 210 may be applied as a single layer or as a double layer.

Figure 6:
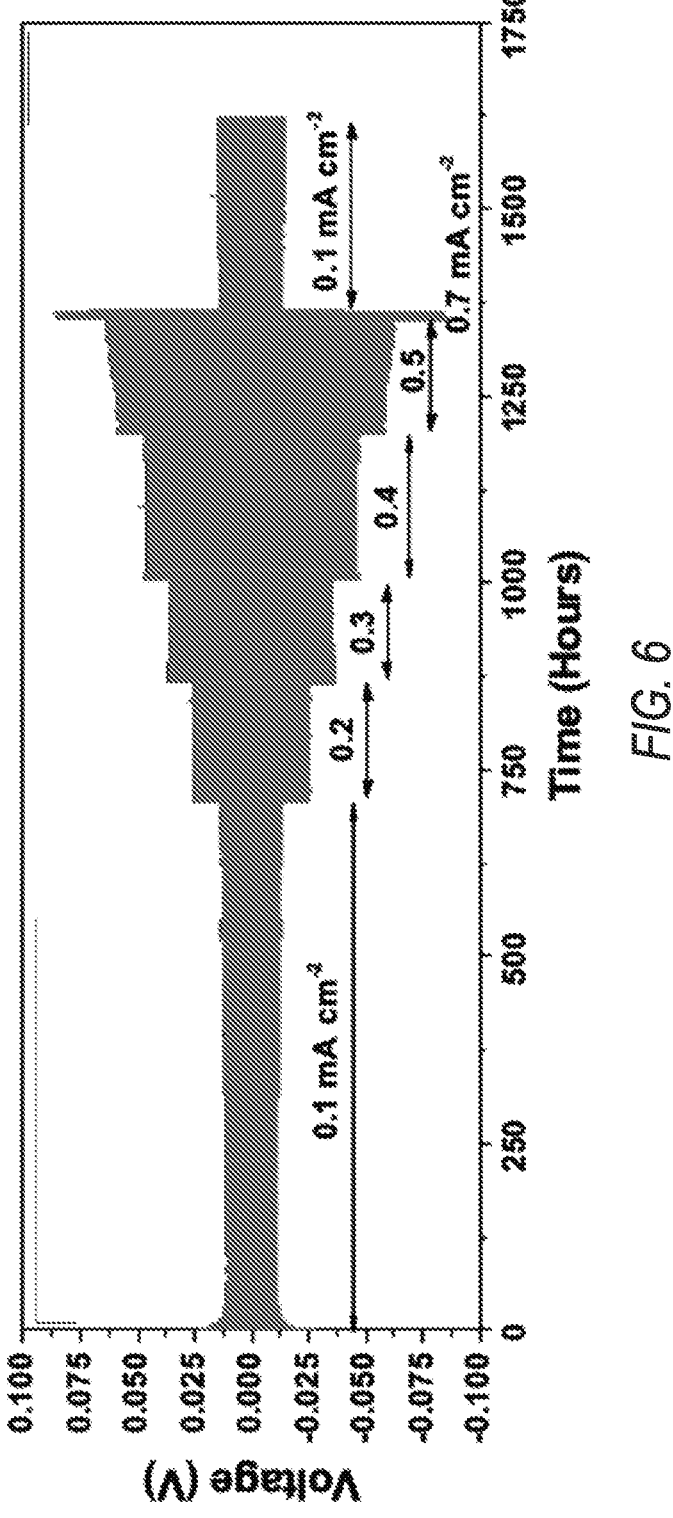
FIGS. 6 and 7A-7D illustrate results of dendrites testing of a symmetrical cell with a sub-nanometer porous membrane at different current densities.
Figures 7A, 7B, 7C, 7D:
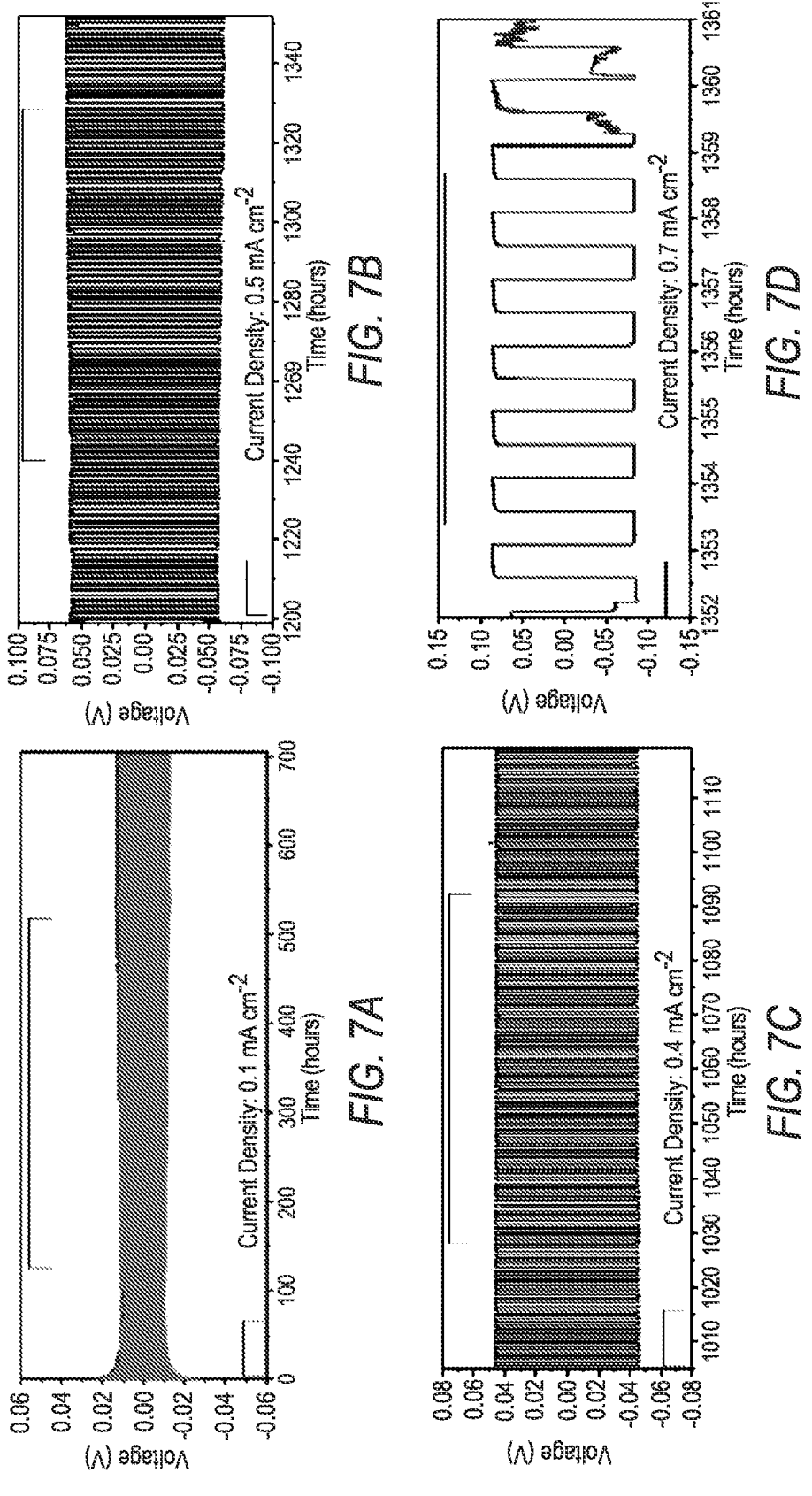

Referring now to FIG. 6 through FIG. 7D, the results of various dendrites testing on a symmetrical cell 200 are illustrated. As seen in the results, the Li symmetrical cell with a single layer of the sub-nanometer porous membrane 210 also had very high performance.

Figure 8:
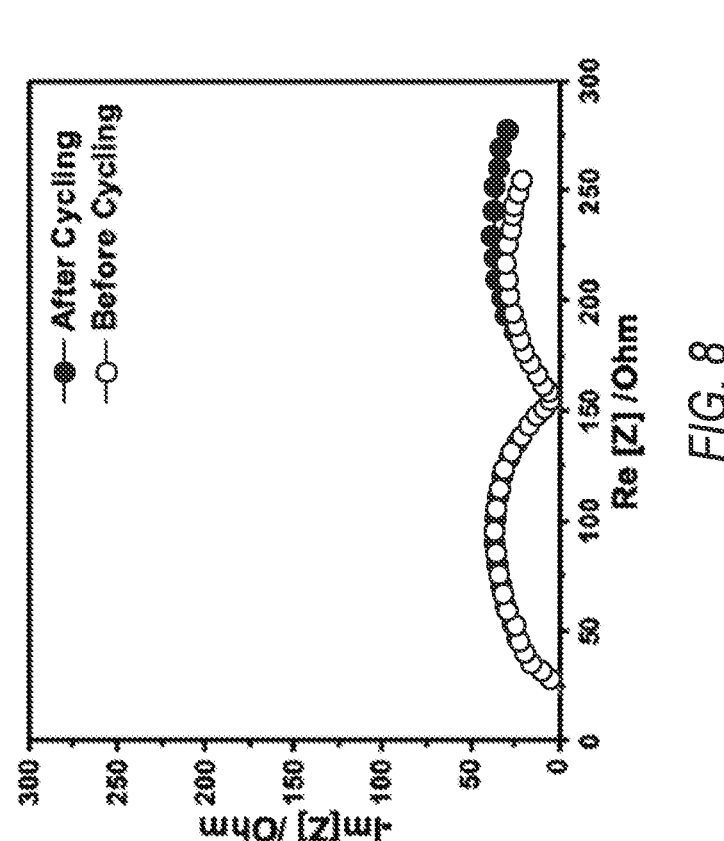
FIG. 8 illustrates results of Electrical Impedance Spectroscopy (EIS) measurements of the exemplary Li symmetrical cell using solid-state electrolyte before and after cycling.

As further seen in the Electrical Impedance Spectroscopy (EIS) measurements illustrated in FIG. 8, there was very negligible increase in impedance before and after cycling. All solid-state studies were done at 60° C. The double layer coated nano-porous membrane was found to be highly stable even at a current density of 0.7 mA $cm^{-2}$. This would be of great interest to industries as very high performance is achieved with stable polarization.

The use of the sub-nanometer porous membrane 110, 210 for both the conventional lithium-ion battery 100 and the all-solid-state battery 200 removes the barrier of using lithium metal anodes, which has the highest theoretical capacity of 3861 mAh $g^{-1}$. Further, the critical current density of garnet-type solid-state electrolyte was found to be very low, which has been improved by several times by incorporating the nano-porous membrane into the battery.

The lithium-ion battery incorporating the sub-nanometer porous membrane has the following advantages: high energy density, better safety, use of lithium metal anode, and high critical current density.

While embodiments of the invention have been described, it is not intended that these embodiments illustrate and describe all possible forms of the invention. Rather, the words used in the specification are words of description rather than limitation, and it is understood that various changes may be made without departing from the spirit and scope of the invention.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description but is only limited by the scope of the appended claims.

What is claimed is:

1. A lithium-ion battery comprising:
an anode;
a cathode;
a separator between the anode and cathode, the separator being at least partially coated with a sub-nanometer porous membrane; and
wherein the sub-nanometer porous membrane is a carbon nanomembrane (CNM) coated on at least a cathode side of the separator.

2. A lithium battery, comprising:
an anode;
a cathode;
a separator between the anode and cathode, the separator being at least partially coated with a sub-nanometer porous membrane;
wherein the sub-nanometer porous membrane is a carbon nanomembrane (CNM) coated on at least a cathode side of the separator; and
wherein the anode is a lithium metal anode.

3. The lithium-ion battery of claim 1, wherein the sub-nanometer porous membrane has an average pore diameter ranging between 0.3 nm and 0.9 nm and the sub-nanometer porous membrane has a pore density ranging between about $10^{12}$ pores per $cm^2$ about $10^{14}$ pores per $cm^2$.

4. The lithium-ion battery of claim 1, wherein the sub-nanometer porous membrane has a thickness ranging between 0.6 nm and 2.0 nm.

5. The lithium-ion battery of claim 1, wherein the sub-nanometer porous membrane has a Young's Modulus ranging between 5 GPa to 500 GPa.

6. The lithium-ion battery of claim 1, wherein the sub-nanometer porous membrane is electronically insulating with a relative dielectric constant of 3 k to 5 k.

7. The lithium-ion battery of claim 1, wherein the CNM is further coated on an anode side of the separator.

8. The lithium-ion battery of claim 1, wherein the CNM is one layer.

9. The lithium-ion battery of claim 1, wherein the CNM is two layers.

10. The lithium-ion battery of claim 1, wherein the anode and the cathode are at least partially submerged in an electrolytic solution.

11. The lithium-ion battery of claim 10, wherein the electrolytic solution includes 1M $LiPF_6$ in ethylene carbonate (EC) and dimethyl carbonate (DMC) in a 1:1 ratio.

12. The lithium-ion battery of claim 1, wherein the lithium-ion battery is an all-solid state battery having a solid-state electrolyte, which serves as the separator.

13. The lithium-ion battery of claim 12, wherein the solid-state electrolyte is a garnet-type electrolyte.

14. The lithium-ion battery of claim 13, wherein the solid-state electrolyte is $Li_{6.5}La_3Zr_{1.5}Ta_{0.5}O_{12}$ (LLZT).

15. A lithium-ion battery comprising:
an anode;
a cathode;
an electrolytic solution in which the anode and cathode are at least partially submerged;
a separator between the anode and cathode;
a sub-nanometer porous membrane at least partially coating the separator; and
wherein the sub-nanometer porous membrane is a carbon nanomembrane (CNM) having an average pore diameter ranging between 0.3 nm and 0.9 nm.

16. A lithium-ion battery comprising:
an anode;
a cathode;
a solid-state electrolyte disposed between the anode and cathode;
a sub-nanometer porous membrane at least partially coating the solid electrolyte; and
wherein the sub-nanometer porous membrane is a carbon nanomembrane (CNM) coated on at least a cathode side of the solid electrolyte.

17. The lithium-ion battery of claim 16, wherein the CNM is further coated on an anode side of the solid-state electrolyte.

18. The lithium-ion battery of claim 16, wherein the CNM is one layer.

19. The lithium-ion battery of claim 15, wherein the CNM is coated on at least a cathode side of the separator.

20. The lithium-ion battery of claim 19, wherein the CNM is further coated on an anode side of the separator.

* * * * *